United States Patent [19]

Huhndorff et al.

[11] Patent Number: 4,690,879

[45] Date of Patent: Sep. 1, 1987

[54] CELL CIRCUIT INTERRUPTER

[75] Inventors: Harry R. Huhndorff, Bay Village; John P. Myers, Cleveland, both of Ohio

[73] Assignee: Eveready Battery Company, St. Louis, Mo.

[21] Appl. No.: 938,303

[22] Filed: Dec. 5, 1986

[51] Int. Cl.[4] .............................................. H01M 2/00
[52] U.S. Cl. ...................................... 429/61; 429/57; 429/59
[58] Field of Search ...................... 429/61, 62, 57, 58, 429/66, 59; 320/47, 46, 54, 30

[56] References Cited

U.S. PATENT DOCUMENTS

| 2,651,669 | 9/1953 | Neumann | 429/58 |
|---|---|---|---|
| 3,081,366 | 3/1963 | Belove | 429/58 |
| 3,373,057 | 3/1968 | Jost et al. | 429/58 |
| 3,617,386 | 11/1971 | Bosben | 429/56 |
| 3,676,221 | 7/1972 | Bach | 429/61 |
| 3,775,661 | 11/1973 | Frezzolini et al. | 429/58 X |
| 4,025,696 | 5/1977 | Tucholski et al. | 429/61 |
| 4,028,478 | 6/1977 | Tucholski | 429/58 X |
| 4,035,552 | 7/1977 | Epstein | 429/58 |

Primary Examiner—Anthony Skapars

[57] ABSTRACT

The invention relates to a cylindrical galvanic cell having a failsafe circuit interrupter means for electrically isolating one terminal of the cells from the cell electrochemical system when the bottom of the cylindrical cell bulges beyond a predetermined amount.

13 Claims, 3 Drawing Figures

CELL CIRCUIT INTERRUPTER

FIELD OF THE INVENTION

The invention relates to a cylindrical galvanic cell and more specifically to a galvanic cell having a failsafe circuit interruption means for electronically isolating one terminal of the cell from the cell's electrochemical system when the bottom of the cylindrical cell bulges beyond a predetermined amount.

BACKGROUND OF THE INVENTION

Galvanic cells, such as alkaline cells, are generally designed to vent when the internal pressure exceeds a predetermined amount. When exposed to an abuse condition, such as being charged to an excessive degree, the cell will normally vent and allow the electrolyte to escape. Although it is preferable to have the electrolyte escape rather than have the cell rupture from internal pressure buildup, electrolyte leakage can be potentially dangerous to persons and destructive to equipment.

Cell manufacturers have used a number of approaches to resolve the problem of electrolyte leakage. One of the most common methods of preventing seal rupture due to abuse charging or the like is to insert a diode in the battery's electrical circuit. By eliminating the possibility of charging the cells, internal gas is not generated and the seal never ruptures. Another electrically related mechanism is a belleville shaped "flip switch". This device is triggered by bulging of the cell bottom which causes a washer to invert and thereby break electrical contact. Another method involves the use of absorbents or electrolyte thickeners. The absorbent materials are usually located outside the seal area and beneath the cell's cover or jacket. As electrolyte escapes from a ruptured seal, the liquid is absorbed. Spew thickeners are mixed with the electrolyte and therefore are contained within the cell. The objective of the thickener is to slow down and/or absorb any leakage that may occur. The disadvantage of using either an absorbent or a thickener is that both materials tie up space that otherwise could be used for active materials of the cell. A third procedure is to use an outer container and end covers as an electrolyte containment system to provide space to contain the electrolyte that escapes.

U.S. Pat. No. 3,676,221 discloses a battery comprising a plurality of stacked, disk-like sealed cells secured together by cups fitted over one cell of each pair and having bottoms spot-welded to the next cell and sidewalls spot-welded to the interfitting cell. A heat-shrunk sheath encloses the battery and has caps forming the poles. Between each pair of cells is a circular disc of insulating material against which the cup bottoms bulge upon expansion of the contents of the cells, thereby breaking the welds and electrically disconnecting the cells.

U.S. Pat. No. 4,025,696 describes a disk shaped washer which inverts after the bottom bulge exceeds a predetermined value. Prior to activation, the washer's inside diameter is slanted toward the container. As the container bulges, the bottom of the container pushes against the washer and eventually causes the washer to invert. This inversion electrically separates the bottom cover from the container. An open circuit is the net result.

U.S. Pat. No. 3,775,661 describes a cell in which internal pressure forces a diaphragm against a switch which electrically disconnects a charging device. The diaphragm is located inside a venting device which is attached to one end of the cell.

U.S. Pat. No. 2,651,669 describes a bulge activated switch that can be incorporated into a single cell battery or a multiple cell battery and operable such that the bulge can be used to open a switch or switches that control the cell's discharging and/or charging circuits.

U.S. Pat. No. 3,617,386 describes a cell in which a thin sheet of metal with "spring back" ability is positioned between the seal and cover of the cell so as to break the cell's electrical circuit when the bulge becomes excessive.

It is therefor an object of this invention to provide a galvanic cell with means for electronically isolating one terminal of the cell from the cell's electrochemical system upon a predetermined bulge in the cell's housing.

Another object of this invention is to provide means for electrically isolating one terminal of a galvanic cell from the cell's electrochemical system upon a predetermined bulge in the cell's housing that will occupy a minimum space requirement so as not to diminish the space allocated for the active components of the cell.

Another object of this invention is to provide a sealed galvanic cell with means for electrically isolating one terminal of the cell from the electrochemical system of the cell upon a predetermined bulge in the cell's housing that is easy to make, cost effective and easy to assemble.

The foregoing and additional objects will become more fully apparent from the following description and the accompanying drawing.

SUMMARY OF THE INVENTION

The invention relates to a sealed galvanic cell comprising a metal container closed at one end and including in said container a positive electrode, a negative electrode and an electrolyte with said container being in electrical contact with one of said electrodes; a cover mounted over said metal container, said cover being secured to said metal container with at least a portion of said cover being electrically insulated from said container and in electrical contact with the other electrode; a conductive member, said conductive member being secured to a portion of the bottom of said container with an electrically insulating securing means so that at least a portion of the interial area of the conductive member is electrically insulated from said container while at least a portion of the peripheral area of the conductive member is in electrical contact with the bottom of said container; and wherein electrically conductive securing means secures the peripheral area of the conductive member to and in electrical contact with the bottom of said container so that when the center of the bottom of said container bulges a predetermined amount, said electrically conductive securing means will break to separate the peripheral area from the bottom of the container thereby breaking the electrical contact between the bottom of said container and said conductive member.

The conductive member should preferably be rigid so that as the conductive securing means breaks from bulging of the center area of the bottom of the cell's container, the conductive member will remain relatively flat thereby assuring that it will break electrical contact with the container. In other words, the cell's bottom bulge will be sufficient to break the conductive securing means and force the rim area of the conductive member away from and electrically insulated from the container.

The insulating securing means could be an electrically nonconductive adhesive that secures the inner area of the conductive member to the bottom of the container. Suitable nonconductive adhesives for this invention are methyl methacrylate, ethyl cyanoacrylate, bisphenol A/epichlorohydrin resin and polyamide blends, and the like.

The nonconductive adhesive should be applied so that it bonds the conductive member to the bottom of the cell's container with sufficient strength to prevent tipping of the conductive member when the cell bulges. In addition, the nonconductive adhesive must allow direct electrical contact to be made between the bottom of the container and the peripheral rim of the conductive member. To maintain the electrical contact between these members, the peripheral area of the conductive member could be welded to the bottom of the container using one or more welds. Although various pressure contact systems, such as conductive adhesives, can be used in the subject invention, the incorporation of at least one weld at the peripheral area of the conductive member is preferable for insuring electrical contact between the conductive member and the container until the moment the bulge exceeds a predetermined amount that will exceed the weld strength.

In the preferred embodiment, the container would be a cylindrical container, the conductive securing means would be at least one weld, and the conductive member would be a disc-shaped member that could function as a cover member for the cell. The simple design of the circuit interrupter means of this invention provides a number of unique features. First, when a nonconductive adhesive is employed, it can be easily applied as a layer between about 0.001 inch and 0.05 inch thick, preferably between about 0.01 inch and about 0.02 inch thick. Thus the circuit breaker means will require little or no additional space within the cell since the conductive member can function as a cover for the cell.

The subject invention will effectively eliminate electrolyte leakage due to abusive charging or overdischarging, does not require an additional electrical component, is relatively simple to incorporate into a manufacturing process, and effectively does not take up any usable space within the cell's interior. In the preferred embodiment, at least one weld between the cover's rim and the container's bottom will be suitable. In addition, preferably an electrically nonconductive adhesive must secure only a portion of the cover to the container. This adhesive performs two functions. First, the adhesive holds the cover substantially perpendicular to the cell's longitudinal axis and second, the adhesive electrically insulates the cover from the container after the weld has broken.

The simple design of the circuit interrupter means of this invention provides a number of unique features. The circuit interrupter means can be incorporated into the cell construction currently used in production without changing the cell's design. The circuit interrupter means is positive and irreversible such that the electrical connection between the cover and container is kept intact until the moment the weld is broken. This is a particularly desirable feature since many other circuit breaking mechanisms generally pass through an interim phase in which electrical contact is sporadic. This phenomemon could result in "chattering" at the point of contact. The circuit interrupter means is inexpensive since there are no costly mechanical parts to purchase. Cell parts currently used in production do not need to be modified since a small amount of a commercially available adhesive is all that is required to be applied between the bottom of the container and the cover.

In spite of the simple design of the circuit interrupter means of this invention, there are a number of variables that can be altered to make the circuit interrupter means perform as desired. In the preferred embodiment, the two controlling characteristics are (1) quality of the adhesive bond and (2) strength of the welded contact. Some of the factors which affect the adhesive bond are (1) amount of adhesive, (2) diameter of the adhesive pattern as it is applied between the bottom of the container and the conductive member, (3) cleanliness of the interface of the container bottom and conductive member, etc. Weld strength is significantly influenced by: (1) number of welds, (2) power setting on the welder, (3) length of time the welder is activated, etc. Another variable is the jacket material which is used to enclose the cells. While shrink tube jackets can be pushed away from the cover's rim area by the edge of the bottom cover, the use of metal jackets may affect the cover's ability to separate itself from the can. In general, the weld strength must be sufficient to hold the cover to the bottom of the container until the bulge reaches a predetermine amount. After this predetermined bulge amount is exceeded, the weld must break prior to seal vent activation. Since a number of variables can be adjusted to compensate for each other, there are a variety of conditions that will produce acceptable results.

In some applications the control of the degree of bulge to break the weld could be somewhat critical. For commercial applications, the weld should not be broken from an amount of bulge that normally would occur when the cell is subject to high temperature storage. Thus the degree of bulge should generally be beyond the normal bulge that can be encountered in high temperature storage but below the degree of bulge that will break the seal and let electrolyte escape. For example, in a standard type alkaline D-size cylindrical cell (2.277 inches high and 1.318 inches diameter), the bottom of the container can bulge as much as 0.025 inch when stored at 71° C. for an eight (8) week period and can vent when the bulge exceeds 0.070 inch. Consequently, for this size and type cell system, the weld should generally be designed to break when the bulge is between about 0.030 and about 0.070 inch.

This invention is ideally suited for alkaline cells employing a $MnO_2$ positive electrode, a zinc negative electrode and an electrolyte solution comprising potassium hydroxide.

The present invention will become more apparent from the following description thereof when considered together with the accompanying drawing which is set forth as being exemplary of the present invention and is not intended to be limitative thereof in any respect.

Figure 1:
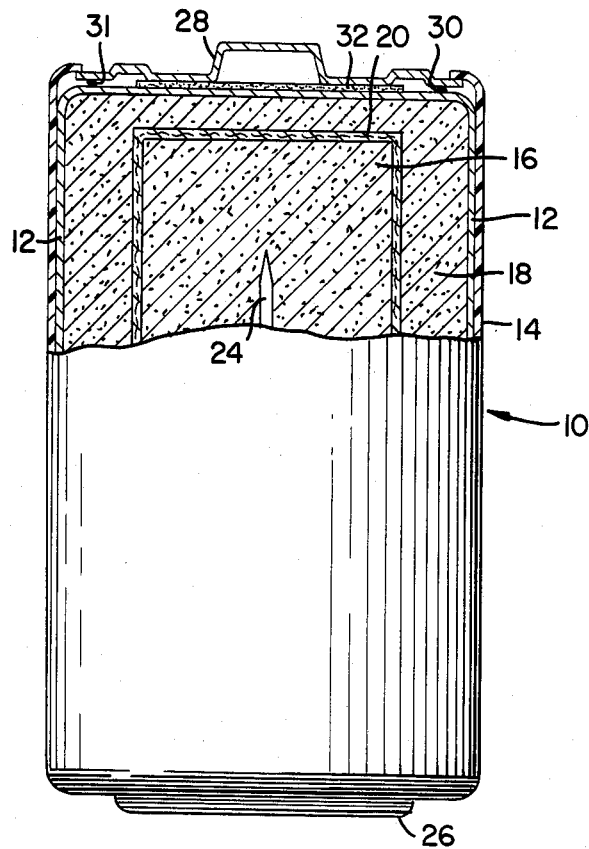
FIG. 1 is an elevational view partially in cross-section of an alkaline manganese dioxide zinc cell embodying the circuit interrupter means of the present invention.
Figure 2:
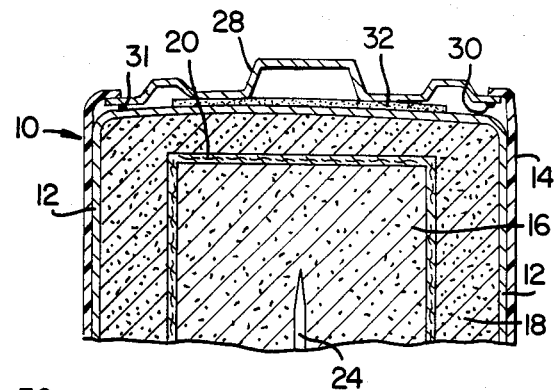
FIG. 2 is an elevational view of part of the cell in FIG. 1 showing the cover lifted on one side from the container.
Figure 3:
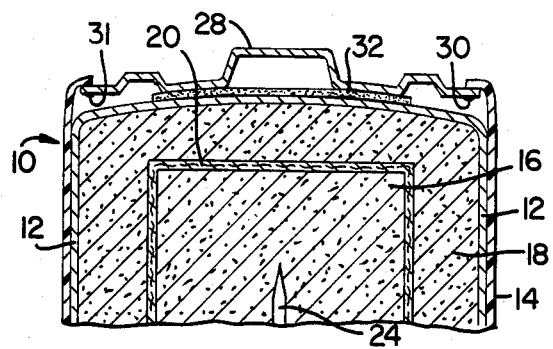
FIG. 3 is an elevational view of part of the cell in FIG. 2 shows the cover lifted on its rim away from the container.

Referring now to the drawing and particularly to FIGS. 1-3 inclusive in which a typical alkaline galvanic cell 10 of the present invention is shown comprising an inverted metallic cupped container 12 provided with an outer plastic shrink label 14. Disposed within the container 12 is a anode 16, a cathode 18, a separator 20 and an alkaline electrolyte which permeates the anode 16, cathode 18, and separator 20 respectively. An anode current pin type collector 24 extends lengthwise within the cell 10, parallel to the longitudinal axis of the cell, from a location in contact with the anode 16 to the negative end 26 of the cell 10 where it terminates.

A cup-shaped cover 28 is shown spot welded 30-31 to the bottom of container 12. Prior to welding the cover 28 to container 12, an electrically nonconductive adhesive 32 is placed between the bottom of container 12 and cover 28 over an area sufficient so that only the inner area of cover 28 will contact the electrically nonconductive adhesive 32 thereby leaving the peripheral area or rim area of cover 28 in electrical contact with container 12. Cover 28 is welded (30-31) to container 12 to assure good electrical contact between these components.

FIG. 2 shows the beginning of the bulge in cell 10 so that weld 30 on the right is broken thereby lifting cover 28 away from container 12 at this area. Weld 31 is still functional so that cover 28 is still in electrical contact with container 12. This insures that cover 28 will maintain electrical contact with container 12 when a little bulge occurs in the bottom of container 12.

After a predetermined amount of bulge occurs that is designed to break all the welds (31-32) connecting the rim of cover 28 to container 12, the cover 28 is lifting away from electrical contact with container 12 as shown in FIG. 3. As evident from FIG. 3, cover 28 is still secured to container 12 via electrically nonconductive adhesive 32 but its electrical contact is broken thereby electrically isolating cover 28 from the container 12. By designing the degree of bulge to break the welds, this invention can effectively isolate the terminal cover 28 from the circuit of the cell prior to the cell venting or rupturing which would cause electrolyte to escape.

EXAMPLE

Ninety alkaline manganese dioxide zinc cells were manufactured with an electrically nonconductive adhesive between part of the positive cover and the cell bottom as basically shown in FIG. 1. The test cells, which measured approximately 2.277" high and 1.318" in diameter, are commonly referred to as D-size cells. The electrically nonconductive adhesive was an epoxy of a 1 to 1 (by weight) mixture of Eccobond 45CL and Eccobond's catalyst number 15CL (Eccobond is a tradename of Emerson and Cumings, Inc., Woburn, MA). The Eccobond 45CL is a bisphenol A/epichlorohydrin resin. Eccobond's catalyst number 15CL is a polyamide blend. Approximately 0.26 gram of the two part mixture was applied to the bottom of each cell. The electrically nonconductive adhesive layer was approximately ¾" in diameter and 0.010" to 0.020" thick. This pattern was concentric with the cell's diameter. Next, the positive cover was placed on top of the adhesive. Since the cover was manufactured in a hat shaped configuration, as generally shown in FIG. 1, the central portion of the cover did not contact the adhesive. Only the bottom interior section of the cover touches the adhesive. The outer peripheral part or rim of the cover sat directly on the bottom of the cell's container. After the adhesive was applied, the cover was spot welded to the container. Three separate welds, approximately 120 degrees apart and ⅛" in from the cover's outer perimeter were produced. A welder, purchased from the Industrial Products Division of Hughes Aircraft Company was used to form the welds. The following settings were used: medium tap; two cycles per weld; 28% heat adjustment and sufficient head pressure. All cells were allowed to sit at room temperature for at least 24 hours before charge testing began. The charge test consisted of a one ampere charge at room temperature until the circuit interrupter opened (welds broke) the cell's circuit or the seal ruptured. Fifty-five of the ninety cells that were tested opened the cell's circuit prior to the seal rupturing. The remaining 35 cells forced the seal to burst before the circuit breakers activated. The success rate of this invention can be increased significantly by determining the optimum weld strength and by selecting the proper adhesive thickness for a particular application.

Although the present invention has been described with reference to particular details, it is not intended that these details shall be construed as limiting the scope of this invention.

What is claimed

1. A galvanic cell comprising a metal container closed at one end and including in said container a positive electrode, a negative electrode and an electrolyte with said container being in electrical contact with one of said electrodes; a cover mounted over said metal container, said cover being secured to said metal container with at least a portion of said cover being electrically insulated from said container and in electrical contact with the other electrode; a conductive member, said conductive member being secured to a portion of the bottom of said container with an electrically insulating securing means so that at least a portion of the interial area of the conductive member is electrically insulated from said container while at least a portion of the peripheral area of said conductive member is in electrical contact with the bottom of said container; and wherein electrically conductive securing means secures the peripheral area of the conductive member to, and in electrical contact with, the bottom of said container so that when the center of the bottom of said container bulges a predetermined amount, said electrically conductive securing means will break to separate the peripheral area of said conductive member from the bottom of said container thereby breaking the electrical contact between the bottom of said container and said conductive member.

2. The galvanic cell of claim 1 wherein said electrically insulating securing means is an electrically nonconductive adhesive.

3. The galvanic cell of claim 2 wherein said electrically nonconductive adhesive is selected from the group consisting of methyl methacrylate, ethyl cyanoacrylate, and bisphenol A/epichlorohydrin resin and polyamide blends.

4. The galvanic cell of claim 1 wherein said electrically conductive securing means is at least one weld.

5. The galvanic cell of claim 1 wherein said container is a cylindrical container and said conductive member acts as an external cover member for the cell.

6. The galvanic cell of claim 1 wherein said container is in electrical contact with said positive electrode and said portion of said cover electrically insulated from the container is in electrical contact with said negative electrode.

7. The galvanic cell of claim 1 wherein said container is in electrical contact with said negative electrode and said portion of said cover electrically insulated from the container is in electrical contact with said positive electrode.

8. The galvanic cell of claim 1 where said positive electrode is $MnO_2$, said negative electrode is zinc and said electrolyte solution comprises potassium hydroxide.

9. The galvanic cell of claim 8 wherein said electrically insulating securing means is an electrically nonconductive adhesive and said electrically conductive securing means is at least one weld.

10. The galvanic cell of claim 9 wherein the container is in electrical contact with said positive electrode and said portion of said cover electrically insulated from the container is in electrical contact with said negative electrode.

11. The galvanic cell of claim 3 wherein said electrically nonconductive adhesive disposed between said container and said conductive member is a layer of adhesive between about 0.001 inch thick and about 0.05 inch thick.

12. The galvanic cell of claim 11 wherein said layer is between about 0.01 inch thick and about 0.02 inch thick.

13. The galvanic cell of claim 12 wherein said electrically conductive securing means is at least one weld, said positive electrode is $MnO_2$, said negative electrode is zinc and said electrolyte solution comprises potassium hydroxide.

* * * * *